United States Patent
Date

(10) Patent No.: US 6,897,872 B2
(45) Date of Patent: May 24, 2005

(54) CONTROLLER OF MULTI FUNCTION DEVICE

(75) Inventor: Atsushi Date, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 69 days.

(21) Appl. No.: 10/621,416

(22) Filed: Jul. 18, 2003

(65) Prior Publication Data

US 2004/0024926 A1 Feb. 5, 2004

(30) Foreign Application Priority Data

Jul. 31, 2002 (JP) .......................................... 2002-223125

(51) Int. Cl.[7] .............................................. G06F 13/14
(52) U.S. Cl. ........................ 345/520; 345/519; 345/531; 358/448; 358/501; 358/530
(58) Field of Search ................... 345/519–520, 345/531; 358/448, 501, 530

(56) References Cited

U.S. PATENT DOCUMENTS

| | | | | |
|---|---|---|---|---|
| 4,918,644 | A | * | 4/1990 | Terada et al. ................ 709/251 |
| 5,918,063 | A | * | 6/1999 | Miyama et al. ............... 712/25 |
| 5,923,339 | A | | 7/1999 | Date et al. ................... 345/505 |
| 6,078,337 | A | | 6/2000 | Fukui et al. ................. 345/521 |
| 6,438,635 | B1 | | 8/2002 | Date et al. ................... 710/113 |
| 6,499,076 | B2 | | 12/2002 | Date et al. ................... 710/113 |
| 2002/0007431 | A1 | | 1/2002 | Date et al. ................... 710/113 |
| 2002/0041336 | A1 | * | 4/2002 | Morimoto et al. .......... 348/518 |
| 2003/0016390 | A1 | * | 1/2003 | Yuasa ......................... 358/1.16 |

FOREIGN PATENT DOCUMENTS

JP   11-45225   2/1999

* cited by examiner

Primary Examiner—Matthew C. Bella
Assistant Examiner—Mackly Monestime
(74) Attorney, Agent, or Firm—Fitzpatrick, Cella, Harper & Scinto

(57) ABSTRACT

An image process unit includes an image input interface that receives inputs of image data from a scanner and generates data packets, an image ring interface 4 that transfer the data packets to an image ring interface 2, and an image output interface that outputs image data to a printer, and a system control unit includes a RAM controller that has a RAM store the data packets transferred from the image process unit and reads the data packets from the RAM, and an image ring interface 1 that transfers the data packets to an image ring interface 3, where packet transfers from the image process unit to the system control unit and in its reverse direction are conducted using mutually different image rings.

7 Claims, 8 Drawing Sheets

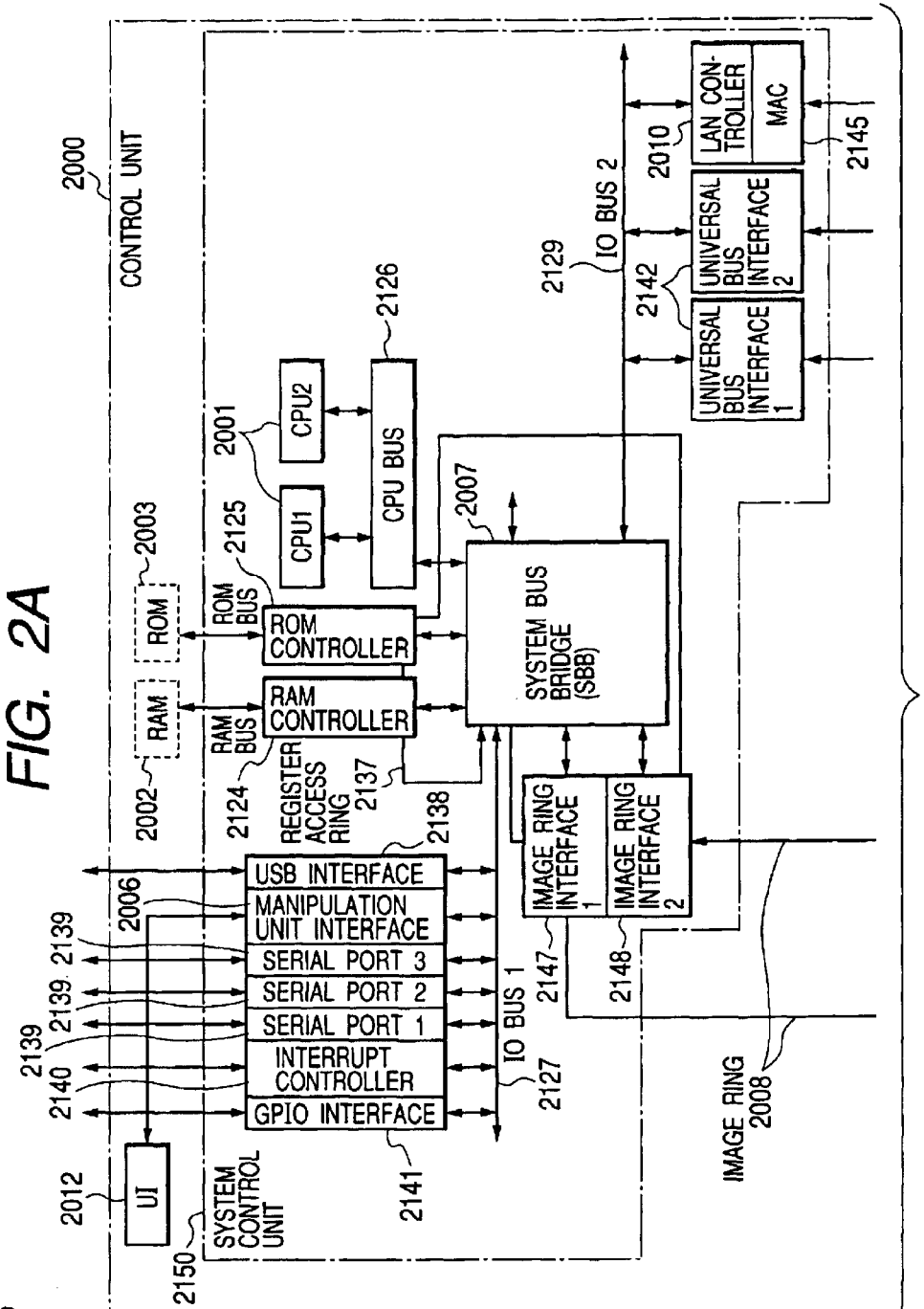

CONTROLLER OF MULTI FUNCTION DEVICE

BACKGROUND OF THE INVENTION

1. Field of the Invention

The present invention relates to an image process device functioning as a controller of a multi function device which includes a CUP, a memory, a computer connection interface, a network interface, a printer interface, a scanner interface, various static image process units, or the like, and which is operable for scanning, printing, transfer of image data over network, storing of images, or the like.

2. Related Background Art

As described in, for example, Japanese Patent Application Laid-Open No. 11-45225, there has been proposed a controller of a multi function device that is configured on a single semiconductor substrate.

Also, another controller of the multi function device, in which a plurality of image process units are connected to a single common bus represented by a PCI bus, has been proposed.

The conventional multi function device controller configured on the single semiconductor substrate, however, suffers from a problem that the configuration thereof may not easily be modified in the case of processing capacity shortage.

Besides, the multi function device controller in which the plurality of image process units are connected to a single common bus also suffers from a problem that the single bus restricts system capabilities because the controller is so designed that image data is transmitted through the common bus. Furthermore, there is a disadvantage that the large number of components raises the cost of the device.

SUMMARY OF THE INVENTION

It is, therefore, an object of the present invention to provide an inexpensive controller of a multi function device of which system configuration is easily changeable.

According to one aspect, the present invention which achieves these objectives relates to an image process device including an image process unit and a system control unit, wherein the image process unit comprises: an image input interface that receives inputs of image data from an image input device; a data packet generating means for generating a data packet from the image data; a first packet transfer means for transferring the data packet to the system control unit; and an image output interface that outputs image data to an image output device, and the system control unit comprises: memory control means for having a memory store the data packet transferred from the image process unit and reading out the data packet from the memory; and a second packet transfer means for transferring the data packet to the image process unit, the first and second packet transfer means transferring packets using mutually different connection paths between the system control unit and image process unit.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

In the following, a preferred embodiment according to the present invention will be described in detail with reference to the accompanied drawings.

Detail description of a device and operation thereof in one embodiment of the present invention is given hereinbelow.

[Device Configuration]

Figure 1:
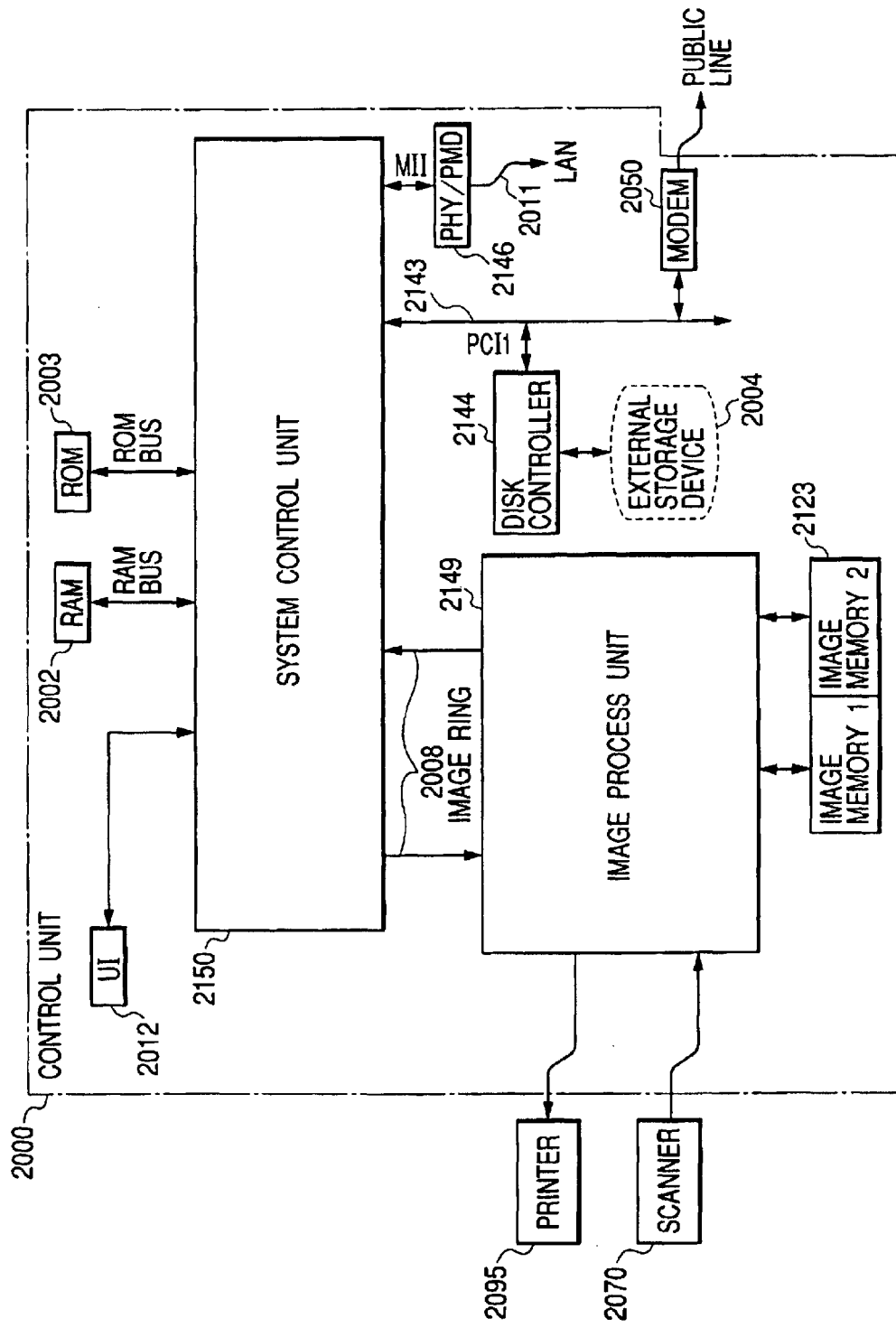
FIG. 1 is a block diagram showing a configuration of a controller in an embodiment.

FIG. 1 shows a block diagram of a controller according to the embodiment.

In a controller unit 2000, a system control unit 2150 controls the entire system, and an image process unit 2149 executes image processing. The system control unit 2150 and the image process unit 2149 are connected with each other via a pair of image rings 2008. The system control unit 2150 is connected to a manipulation unit 2012, RAM 2002 and ROM 2003.

Shown in FIG. 1 is an example in which the system control unit 2150 is connected with a disk controller 2144, a modem 2050 and a PHY/PMD 2146 via a universal PCI bus 2143.

The image process unit 2149 is connected with a printer 2095, a scanner 2070, and image memories 1, 2 2123.

Figure 2B:
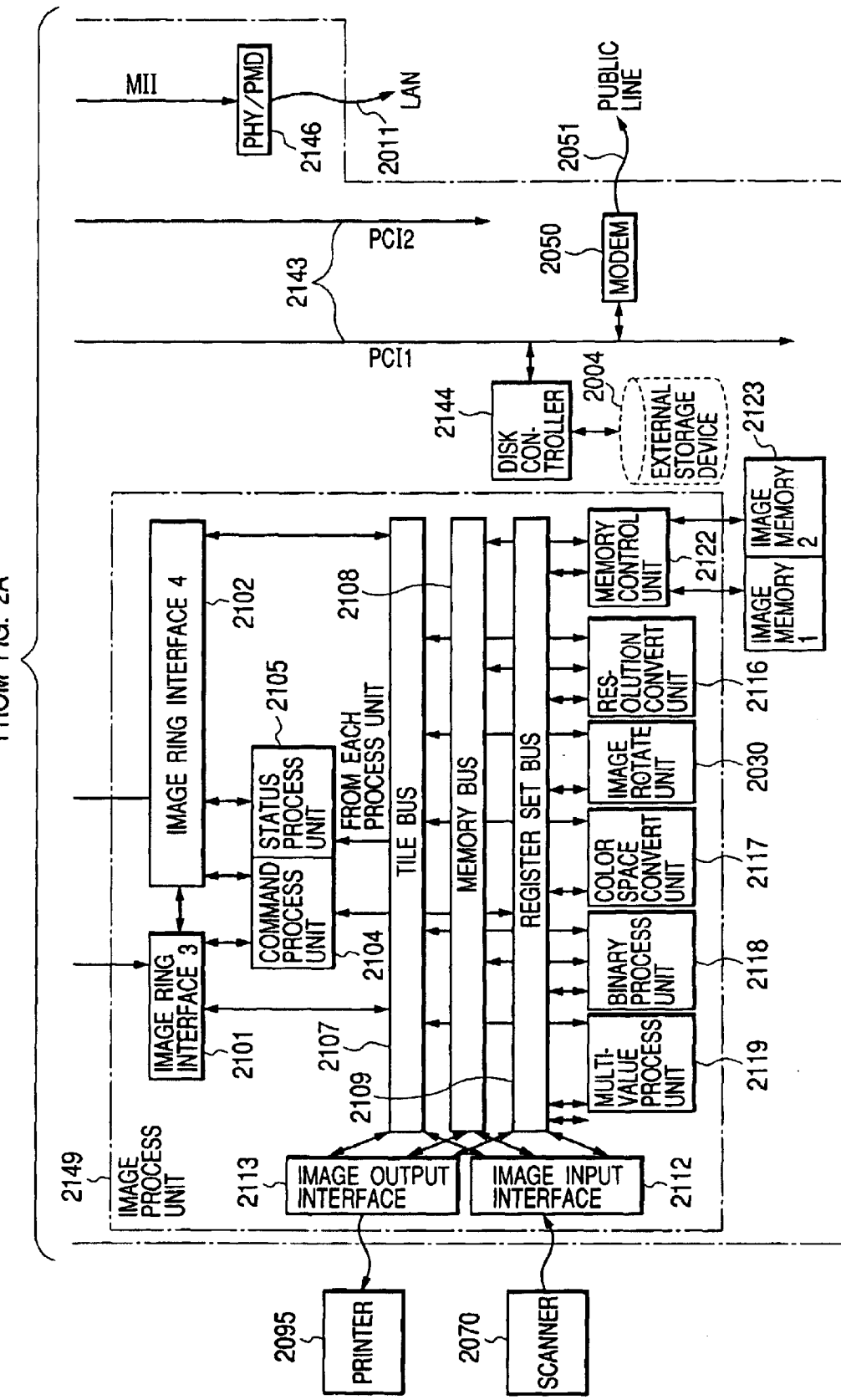
FIG. 2 is comprised of FIGS. 2A and 2B illustrating a diagram showing an actual use environment of a system.

FIGS. 2A and 2B show the entire configuration in further detail. The controller unit 2000 operates as a controller for input/output of image information and device information, and for developing images of PDL data by being connected to the scanner 2070 operable as an image input device and to the printer 2095 operable as an image output device, while establishing connection with a LAN 2011 and a public line (WAN) 2051.

A CPU 2001 is a processor controlling the entire system. In this embodiment, two CUPs are employed. These two CPUs are connected to a common CPU bus 2126 through which the CPUs establish connection with a system bus bridge 2007.

The system bus bridge 2007 is a bus switch which is connected with the CPU bus 2126, a RAM controller 2124, a ROM controller 2125, an IO bus 1 (2127), an IO bus 2 (2129), an image ring interface 1 (2147) and an image ring interface 2 (2148).

The RAM 2002 is a system work memory used for operations of the CPU 2001 and is also an image memory for temporarily storing image data. The RAM 2002 is controlled by the RAM controller 2124.

The ROM 2003 is a boot ROM which stores boot programs of the system, and is controlled by the ROM controller 2125.

The IO bus 1 (2127), which is a sort of internal IO buses, is connected with a controller of a USB bus that is a standard bus, a USB interface 2138, a universal serial port 2139, an interrupt controller 2140 and a GPIO interface 2141. The IO bus 1 (2127) includes a bus arbiter (not shown).

A manipulation unit interface 2006 is an interface for the manipulation unit (UI) 2012 and is operable to output to the manipulation unit 2012 the image data to be displayed thereon. The manipulation unit interface 2006 is also responsible for transmitting to the CPU 2001 information inputted from the manipulation unit 2012 by users of the system.

The IO bus 2 (2129), which is a sort of internal IO buses, is connected with universal bus interfaces 1, 2 (2142) and a LAN controller 2010. The IO bus 2 (2129) includes a bus arbiter (not shown).

The universal bus interfaces 1, 2 (2142), which are composed of the same two bus interfaces, are bus bridges supporting a standard IO bus. Shown in the embodiment is an example in which PCI buses 1, 2 (2143) are employed.

A HDD 2004 is a hard disk drive which stores system software and image data, and is connected to the PCI bus 1 (2143) via the disk controller 2144.

The LAN controller 2010 is connected to the LAN 2011 via an MAC circuit 2145 and via the PHY/PMD circuit 2146 for information input/output.

The modem 2050 is connected to the public line 2051 for information input/output.

Each of the image ring interface 1 (2147) and the image ring interface 2 (2148) is a DMA controller which connects the system bus bridge 2007 and the image rings 2008 transferring image data at high speed with each other to transmit tiled data between the RAM 2002 and the image process unit 2149.

The image rings 2008, which are composed by a combination of a pair of one-way connection paths, transfer image data packets at high speed and are connected to a command process unit 2104, a status process unit 2105 and a tile bus 2107 via an image ring interface 3 (2101) and an image ring interface 4 2102 within the image process unit 2149.

In addition to the image ring interfaces 3 (2101) and 4 (2102), the command process unit 2104 is connected to a register set bus 2109 so that the command process unit 2104 may write a register set request issued and inputted by the CPU 2001 via the image ring 2008 into a relevant block being connected to the register set bus 2109, and that it may read out information from a relevant register via the register set bus 2109 in accordance with a register read request issued by the CPU 2001 and then transfer the information to the image ring interface 4 (2102).

The status process unit 2105 monitors information in each image process unit, and generates interrupt packets for issuing an interrupt to the CPU 2001 to output them to the image ring interface 4.

In addition to the above blocks, the tile bus 2107 is connected to the following function blocks: an image input interface 2112; an image output interface 2113; and a plurality of rectangular image process units. Shown in the embodiment is an example in which a multi-value process unit 2119, a binary process unit 2118, a color space convert unit 2117, an image rotate unit 2030 and a resolution convert unit 2116 are implemented as the rectangular image process units.

The image input interface 2112 receives inputs of raster image data subjected to image correction processing by the scanner 2170 which will be described later, and performs structure conversion from the raster image data to rectangular data by a prescribed method set via the register set bus 2109 as well as establishes clock synchronization, then outputs the rectangular data to the tile bus 2107.

The image output interface 2113 receives inputs of rectangular data coming from the tile bus 2107, and performs structure conversion from the rectangular data to raster image data as well as changes a clock rate, then outputs a raster image to the printer 2195.

The image rotate unit 2030 is operable to rotate image data.

The resolution convert unit 2116 is operable to change an image resolution.

The color space convert unit 2117 is operable to convert a color space of color and gray-scale images.

The binary process unit 2118 is operable to binarize a multi-value (color and gray scale) image.

The multi-value process unit 2119 is operable to convert a binary image to multi-value data.

A memory control unit 2122 is connected to a memory bus 2108 so that the memory control unit 2122 may be operable for reading and writing, or refreshing as necessary, of image data from/to the image memories 1, 2 (2123) in accordance with requests of each image process unit by predetermined set address division. Shown in the embodiment is an example in which SDRAM is used as the image memory.

[Entire System Configuration]

Figure 3:
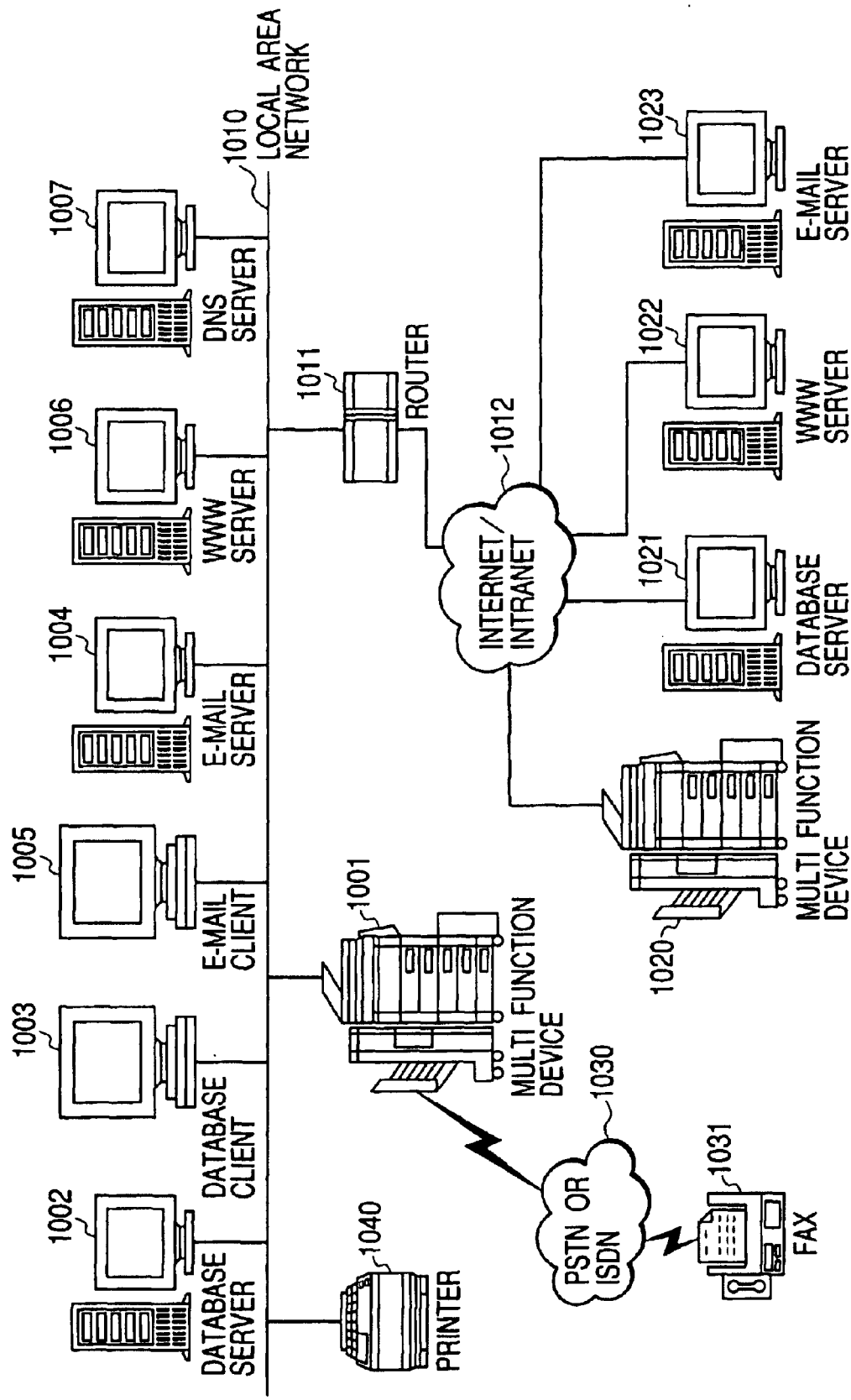
FIG. 3 is a block diagram entirely showing the system controller.

FIG. 3 shows the entire configuration of a network system according to the embodiment.

A multi function device 1001 according to the embodiment is composed of a scanner and a printer, and thus is able to deliver an image read from the scanner to a Local Area Network (hereinafter referred to as a LAN) 1010 and also to print out an image received from the LAN 1010 by the printer. Furthermore, the multi function device 1001 may transmit an image read from the scanner to a PSTN or ISDN 1030 by using the facsimile transmission unit not shown, or may print out an image received from the PSTN or ISDN 1030 by the printer. A database server 1002 manages binary images and multi-value images read into the multi function device as a database.

A database client 1003 of the database server 1002 has the ability to traverse, retrieve, or the like, image data stored in the database of the database server 1002.

An e-mail server 1004 receives an image read by the multi function device 1001 as an attached data of an electronic mail. An e-mail client 1005 receives and reads an electronic mail received by the e-mail server 1004 and also transmits electronic mails.

A WWW server 1006 is a server providing HTML documents to the LAN, and such HTML documents provided by the WWW server 1006 can be printed out by the multi function device 1001.

A DNS server 1007 manages domain names for establishing Internet connection. A router 1011 links the LAN 1010 with an Internet/Intranet 1012. The Internet/Intranet 1012 is linked to the aforementioned database server 1002, WWW server 1006, e-mail server 1004, a multi function device 1020 identical to the multi function device 1001, a database server 1021, a WWW server 1022 and an e-mail server 1023. The multi function device 1001 is so designed as to conduct transmission/reception with a facsimile device 1031 via the PSTN or the ISDN 1030.

Furthermore, a printer 1040 is linked to the LAN 1040 so that the multi function device 1001 may print out an image read out by the multi function device 1001.

[Rectangular Data (Packet) Format]

In the system controller unit 2000 according to the embodiment, image data, a command from the CPU 2001 and interrupt information issued from each block are transferred in a packetized format. In this embodiment, three types of different packets are used, which are a data packet shown in FIG. 4, a command packet shown in FIG. 5 and an interrupt packet shown in FIG. 6.

Figure 4:
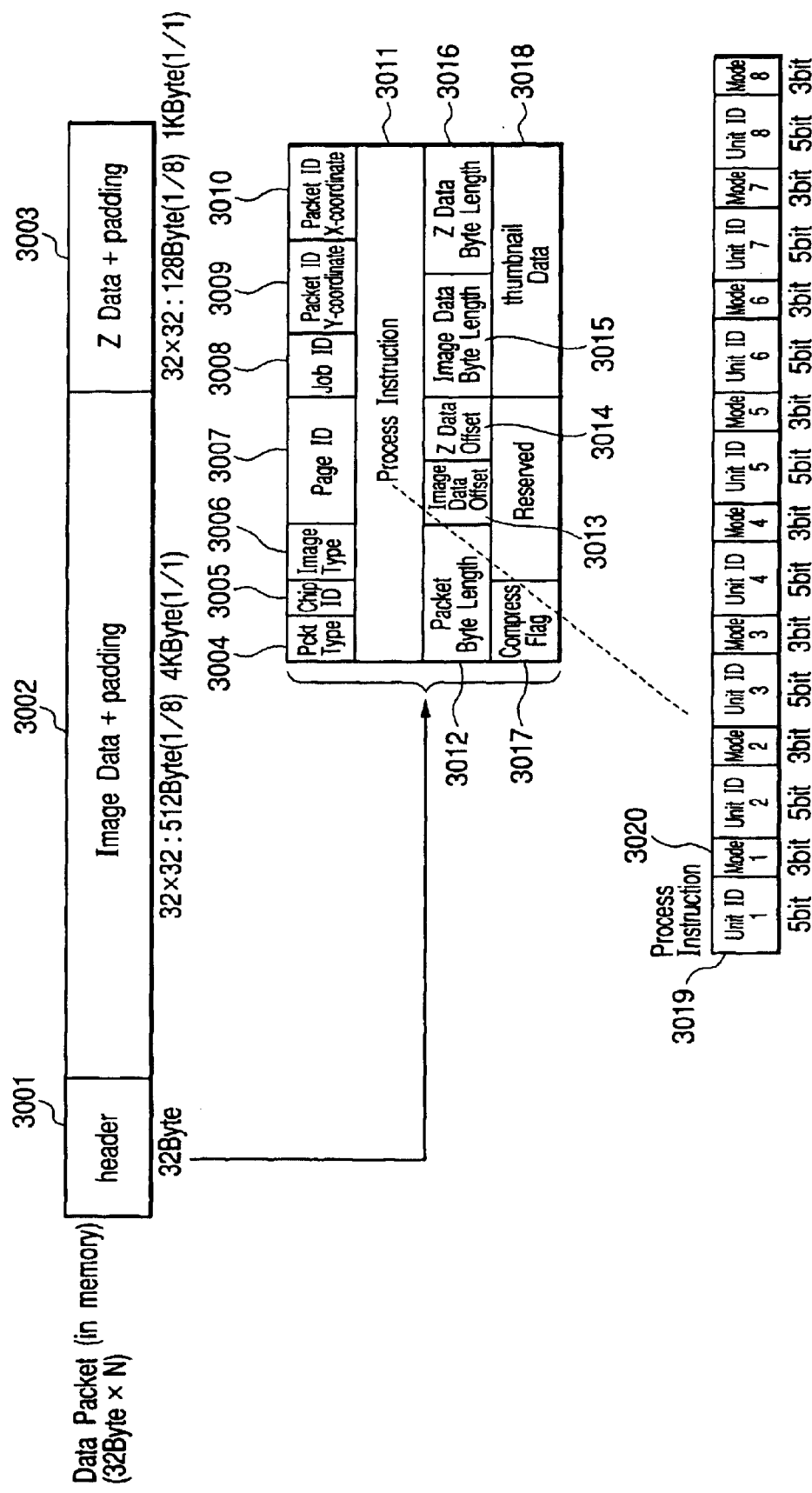
FIG. 4 is a diagram showing an image packet.

Data Packet (FIG. 4)

In the embodiment, it is shown an example in which image data is handled by dividing it into tile units 3002, each consisting of 32×32 pixels. A data packet is formed by adding necessary header information 3001 and image additional information or the like 3003 to the image data divided in tile units.

In the following, information contained in the header information 3001 will be described.

A type of packets is distinguished based on a Pckt Type 3004 in the header information 3001.

A Chip ID 3005 represents an ID of a chip that is a target of packet transmission.

A Data Type 3006 represents a type of data.

A Page ID 3007 indicates a page and a Job ID contains a Job ID 3008 to be managed by software.

A tile number is indicated by YnXn that is a combination of a tile coordinate 3009 in a Y direction and a tile coordinate 3010 in an X direction.

The data packet includes compressed image data or uncompressed image data. In this embodiment, the data packet of uncompressed image data is shown. A Compress Flag 3017 indicates whether the image data is compressed or not.

A Process Instruction 3011 is set from the left side in processing order, and a processed Process Instruction 3011 is shifted leftwards by 8 bits after every processing unit is completed. The Process Instruction 3011 contains eight pairs of a Unit ID 3019 and a Mode 3020. The Unit ID 3019 designates each process unit and the Mode 3020 designates an operation mode in each process unit. This allows one packet to be processed successively in eight process units.

A Packet Byte Length 3012 indicates the total number of bytes of a packet.

An Image Data Byte Length 3015 indicates the number of bytes of image data, a Z data Byte Length 3016 indicates the number of bytes of image additional information, and each of an Image Data Offset 3013 and Z Data Byte Offset 3014 indicates an offset from a head of the packet of respective data.

Figure 7:
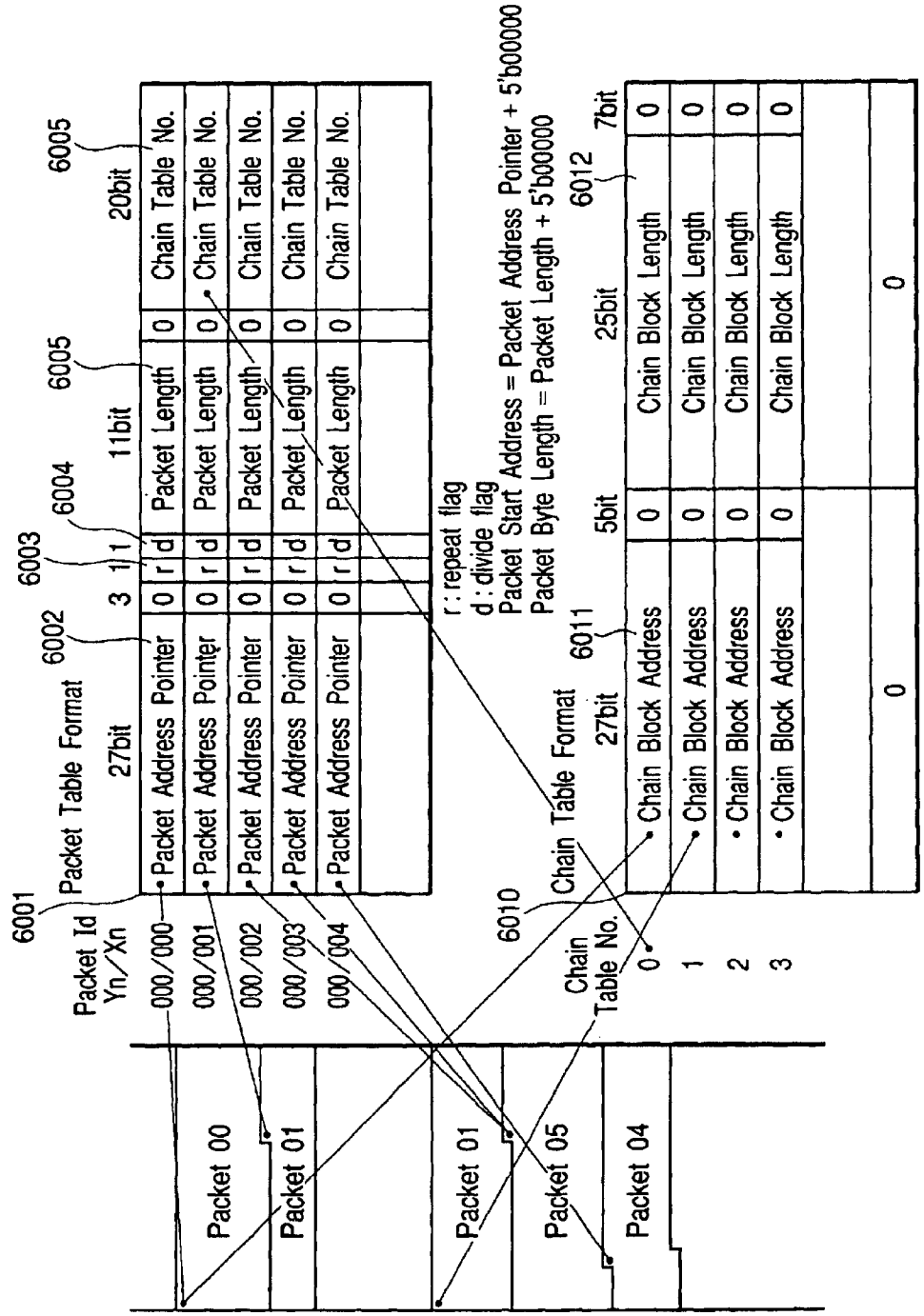
FIG. 7 is a diagram showing a packet table.

Packet Table (FIG. 7)

Each packet is managed in a Packet Table 6001. Components of the Packet Table 6001 are as follows, where a Packet Start Address 6002 and a Packet Byte Length 6005 are obtained by adding 5 bits of zero to respective values in the table.

Packet Address Pointer (27 bits)+5b00000=Packet Start Address

Packet Length (11 bits)+5b00000=Packet Byte Length

The Packet Table 6001 and a Chain Table 6010 are not divided from each other. In the Packet Table 6001, packet data is always arranged in a scanning direction in order of Yn/Xn=000/000, 000/001, 000/002, . . . An entry in the Packet Table 6001 uniquely indicates one tile. An entry coming next to Yn/Xmax is Yn+1/X0.

When a present packet has completely the same data as a preceding packet, the present packet is not written in a memory but the Packet Address Pointer and the Packet Length identical with those of the preceding packet are stored in the Packet Table entry for the present packet. This means that two Table entries indicate one packet data. In this case, a Repeat Flag 6003 is set for the Table entry of the present packet.

When a packet is divided into plural numbers by Chain DMA, a Divide Flag 6004 is set, and a Chain Table number 6006 of a Chain Block containing a start portion of the packet is also set.

An entry of the Chain Table 6010 is composed of a Chain Block Address 6011 and a Chain Block Length 6012 where, in the last entry in the Table, zero is stored for both the Address and Length.

Figure 5:
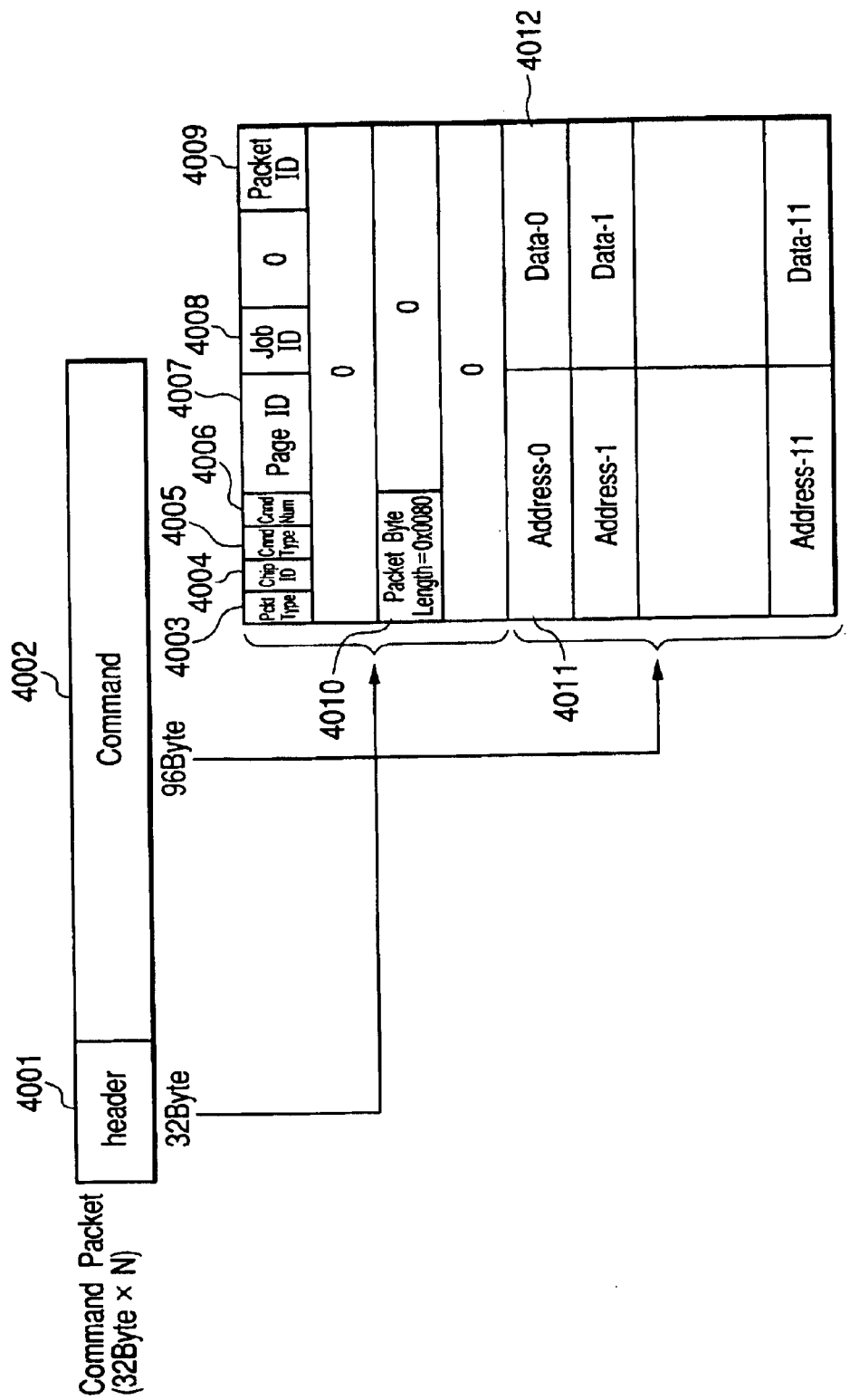
FIG. 5 is a diagram showing a command packet.

Command Packet Format (FIG. 5)

A command packet format is used for accessing the register set bus 2109. By using this command packet, an access is made possible from the CPU 2001 to the image memories 2123.

A Chip ID 4004 contains an ID representing the image process unit 2149 that is a transmission destination of the command packet. A Page ID 4007 and a Job ID 4008 contain a Page ID and Job ID, respectively, to be managed by software. A Packet ID 4009 is one-dimensionally represented using only an X-coordinate of a data packet. A Packet Byte Length 4010 is fixed to 128 bytes.

A packet data portion 4002 may contain twelve commands at maximum, where a combination of an address 4011 and data 4012 is one command. A command type such as Write or Read is indicated by Cmd Type 4005, and the number of commands is represented by Cmdnum 4006.

Figure 6:
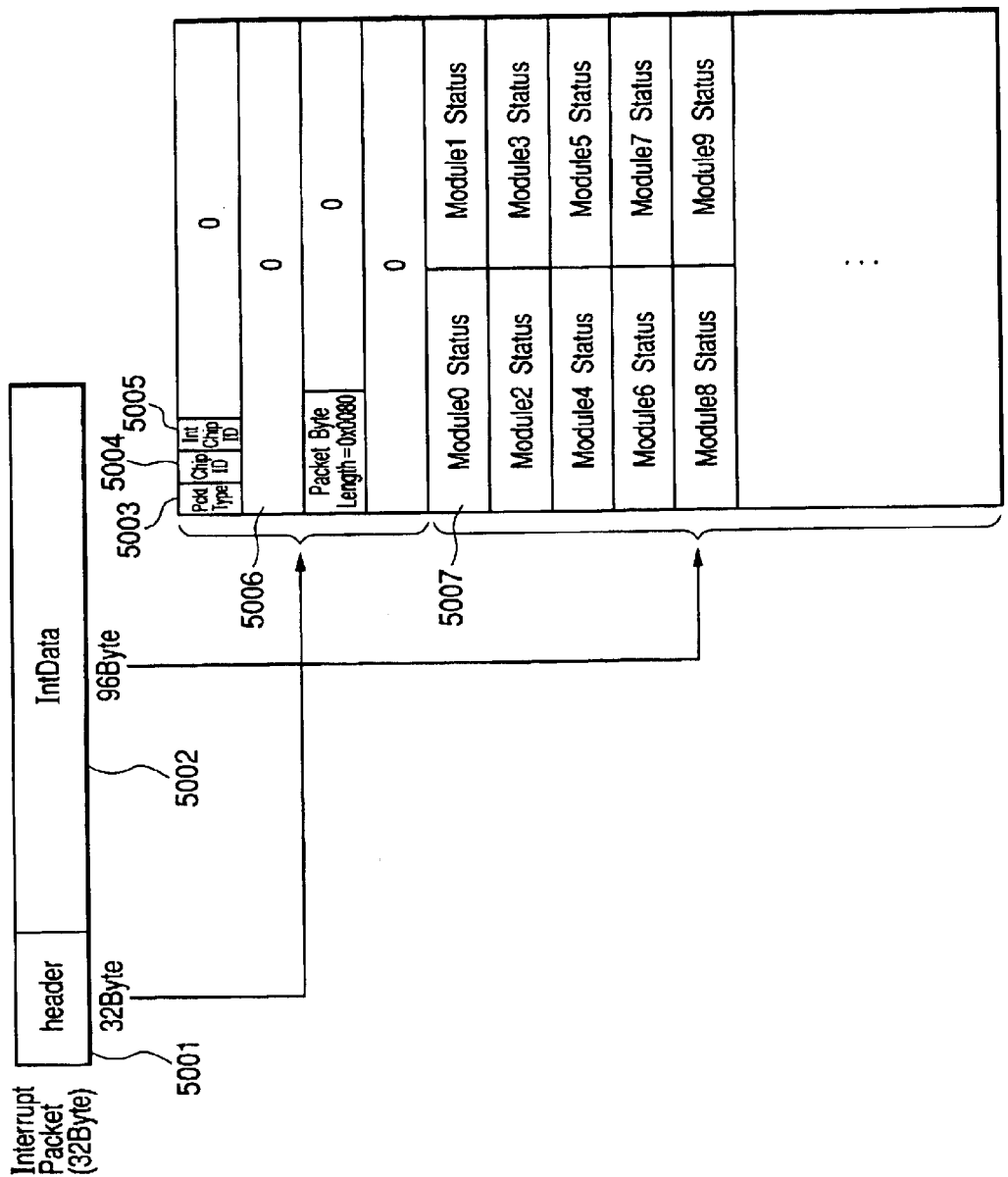
FIG. 6 is a diagram showing an interrupt packet.

Interrupt Packet Format (FIG. 6)

An interrupt packet format is used for notifying of an interrupt from the image process unit 2149 to the CPU 2001. When the status process unit 2105 transmits an interrupt packet, it must not transmit next interrupt packet until permitted. A Packet Byte Length 5006 is fixed to 128 bytes.

A packet data portion 5002 contains status information 5007 of each internal module in the image process unit 2149. The status process unit 2105 is able to collect status information of each module in the image process unit 2149 to transmit the collected status information together to the system control unit 2150.

An Chip ID 5004 contains an ID representing the system control unit 2150 that is a transmission destination of the interrupt packet, and an Int Chip ID 5005 contains an ID representing the image process unit 2149 that is a sender of the interrupt packet.

In the following, a typical process flow will be described.

(1) When a user of the multi function device directs a copying job from the manipulation unit 2012, the CPU 2001 receives information from the manipulation unit interface 2006 and programs the image ring interface 2 (2148) with necessary information including the number of transferring packets, image storage addresses in the RAM 2002, etc., in accordance with information of paper size or the like.

(2) The CPU 2001 programs a command packet generation register inside the image ring interface 1 (2147) via a register access ring 2137, generates a command packet for setting necessary information such as a paper size, color space information, etc., to transmit the command packet via the image ring 2008 to the image input interface 2112 in the image process unit 2149.

(3) The command packet is used for programming the image input interface 2112 via the image ring interface 3 (2101), the command process unit 2104 and the register set bus 2109.

(4) Next, the CPU 2001 programs a scanner communication interface inside the image input interface 2112 using the command packet and directs the scanner 2070 to start scanning.

(5) Image data inputted from the scanner 2070 passes through the image input interface 2112 as well as the memory bus 2108 and is temporarily stored in the image memory 2123 that is controlled by the memory control unit 2122.

(6) The stored image data is read out again by the image input interface 2112 by 32×32 pixels, and is added with header information including the Pckt Type 3004, Chip ID 3005, Data Type 3006, Page ID 3007, Job ID 3008, tile coordinate in Y direction 3009, tile coordinate in X direction 3010, Compress Flag 3017, Process Instruction 3011, Packet Byte Length 3012, etc., then the resultant image data is outputted to the tile bus 2107 as packet data.

(7) Such packet data is sequentially formed and stored in the RAM 2002 after passing through the image ring interface 4 (2102), the image ring 2008 and the image ring interface 2 (2148), on the basis of the information programmed in the image ring interface 2 (2148).

(8) Concurrently, the image ring interface 2 (2148) forms the packet table 6001 in the RAM.

(9) When the scanning operation is completed for one page, the completion is notified to the image input interface 2112 by means of a scanner communication mechanism. The image input interface 2112 notifies the status process unit 2105 of an interrupt using an interrupt signal (not shown).

(10) The states process unit 2105 forms an interrupt packet (FIG. 6) and transmits it to the image ring interface 2 (2148).

(11) The image ring interface 2 (2148) interprets the interrupt packet and transmits an interrupt to the interrupt controller 2140 by an interrupt signal (not shown).

(12) The interrupt is transmitted to the CPU 2001 by the interrupt controller 2140, after which the CPU 2001 detects the completion of the scanning operation.

(13) The CPU 2001 forms a command packet via the register access ring 2137, and sets necessary information for the image output interface 2113 via the image ring 2008, the image ring interface 3 (2101), the command process unit 2104 and the resister set bus 2109, from the image ring interface 1 (2147).

(14) Likewise, the CPU 2001 directs the printer 2095 to enter print standby state by a printer communication mechanism provided in the image output interface 2113 using the command packet.

(15) Subsequently, the CPU 2001 programs a DMA controller provided in the image ring interface 1 2147 with memory addresses at which the packet table exists, or the like.

(16) The DMA controller in the image ring interface 1 (2147) reads data packets from the RAM 2002 in accordance with the programmed information, and outputs them sequentially to the image output interface 2113 via the image ring 2008, the image ring interface 3 (2101) and the tile bus 2107.

(17) The image output interface 2113 extracts image portions from the received data packets, and stores them in the image memory 2123.

(18) At the point when the image data of necessary pixels is stored in the image memory 2123, the image output interface 2113 sequentially reads the image data from the image memory 2123, and then outputs the read image data to the printer 2095.

(19) Consequently, the user obtains an image print as a result of copying.

(20) At the point when image output for the necessary pixels is completed, an interrupt for the completion is transmitted to the CPU 2001 by an interrupt packet.

In the case of plural pages of copying, a printing operation and a scanning operation may be conducted simultaneously, where scan data packets and print data packets do not pass through the same bus because the image rings 2008 are a pair of one-way connection paths.

According to the aforementioned embodiment, packet transfer from the image process unit to the system control unit and packet transfer from the system control unit to the image process unit are performed using mutually different connection paths, which leads to enhancement in capabilities of the device.

Furthermore, each of the system control unit and the image process unit are independently constituted, so that they can be modified separately from each other even in case of lack of processing capability at some future time, thus allowing short-term development of high-performance devices.

Moreover, the system control unit and the image process unit are configured on mutually different semiconductor substrates, thereby reducing the number of components. Accordingly, inexpensive devices can be provided.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. An image process device including an image process unit and a system control unit, wherein
   the image process unit comprises:
      an image input interface that receives inputs of image data from an image input device;
      data packet generating means for generating data packets from image data;
      first packet transfer means for transferring the data packets to the system control unit; and
      an image output interface that outputs image data to an image output device,
   the system control unit comprises:
      memory control means for having a memory store the data packets transferred from the image process unit and reading out the data packets from the memory; and
      second packet transfer means for transferring the data packets to the image process unit, and
   the first and second packet transfer means transfer packets using mutually different connection paths between the system control unit and the image process unit.

2. The image process device according to claim 1, wherein the system control unit and the image process unit are configured on mutually different semiconductor substrates.

3. The image process device according to claim 1, wherein the system control unit further comprises command packet generating means for generating command packets to control operations of the image process unit in accordance with user's manipulations and transfers the command packets to the image process unit by using the second packet transfer means.

4. The image process device according to claim 1, wherein the image process unit further comprises interrupt packet generating means for generating interrupt packets to notify the system control unit of an interrupt, and transfers the interrupt packets to the system control unit by using the first packet transfer means.

5. The image process device according to claim 1, wherein
   the data packet generating means comprises:
      raster rectangle conversion means for converting raster image data into plural pieces of rectangle image data;
      means for generating an page ID that specifies a page of the image data; and means for generating positional data that specifies a position of the rectangle image data, and the data packet includes at least the page ID, the positional data, and the rectangle image data.

6. The image process device according to claim 5, wherein the image process unit further comprises:

means for extracting the rectangle image data from the data packets; and rectangle raster conversion means for converting the plural pieces of rectangle image data into the raster image data in accordance with the page ID and the positional data.

7. The image process device according to claim 5, wherein the image process unit further comprises rectangle image process means for processing the rectangle image data.

* * * * *

UNITED STATES PATENT AND TRADEMARK OFFICE
CERTIFICATE OF CORRECTION

PATENT NO. : 6,897,872 B2
DATED : May 24, 2005
INVENTOR(S) : Date

It is certified that error appears in the above-identified patent and that said Letters Patent is hereby corrected as shown below:

Title page,
Item [57], ABSTRACT,
Line 3, "transfer" should read -- transfers --.

Column 2,
Line 63, "buses," should read -- bus, --.

Column 3,
Line 7, "buses," should read -- bus, --.

Column 5,
Line 25, "set" should read -- sent --.

Column 6,
Line 33, "An" should read -- A --.

Column 8,
Line 31, "device," should read -- device, and wherein --;
Line 37, "and" should be deleted; and
Line 39, "unit," should read -- unit; --.

Signed and Sealed this

Fifteenth Day of November, 2005

JON W. DUDAS
*Director of the United States Patent and Trademark Office*